Figure 1:
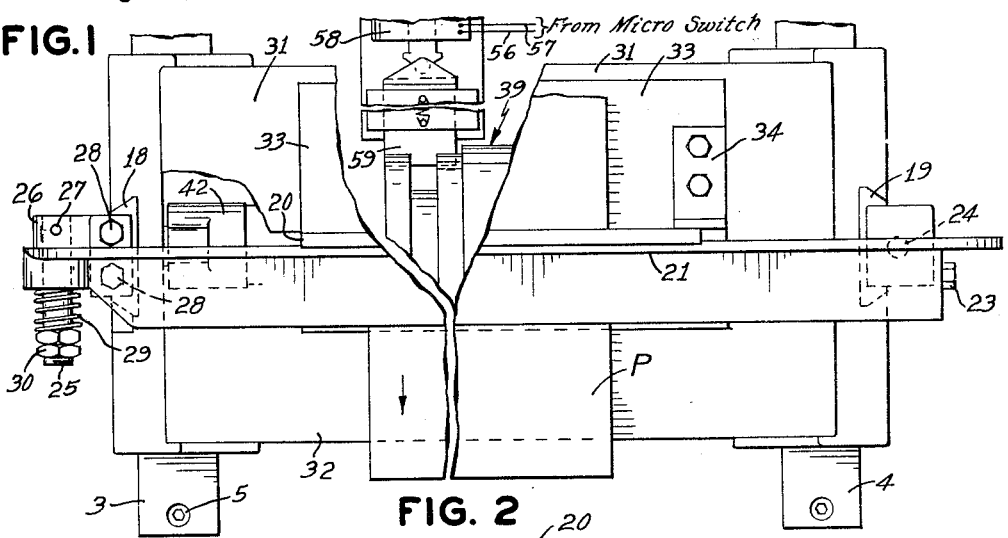

July 18, 1950 E. F. EGAN 2,515,296
CUTTING APPARATUS
Filed Aug. 23, 1949 2 Sheets-Sheet 1

INVENTOR.
Edward F. Egan
BY
ATTORNEYS

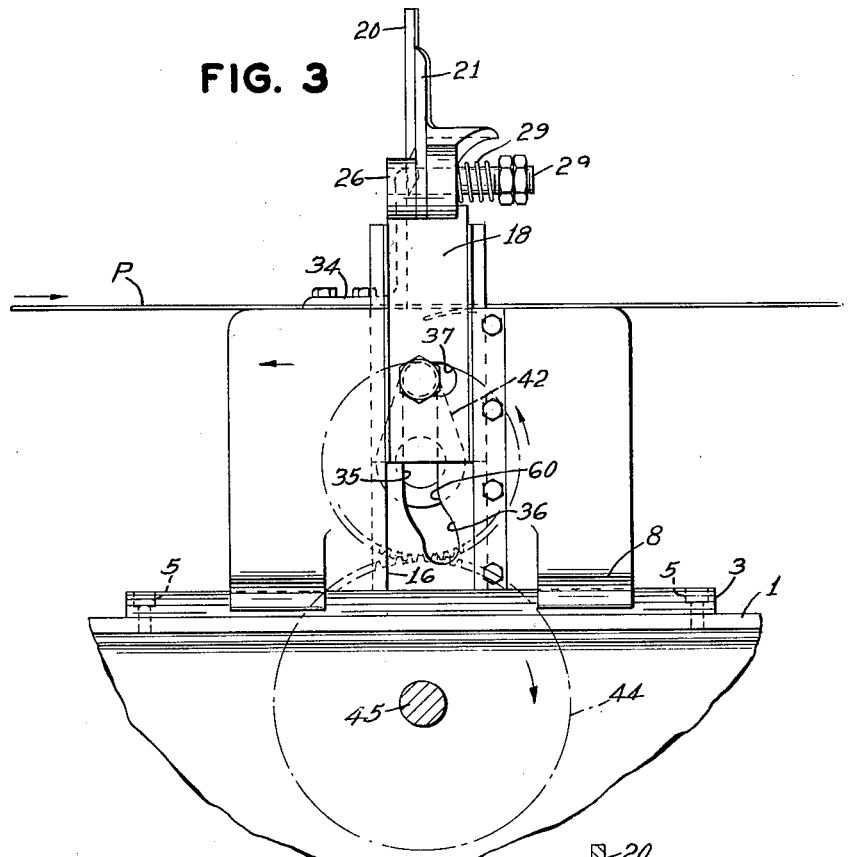
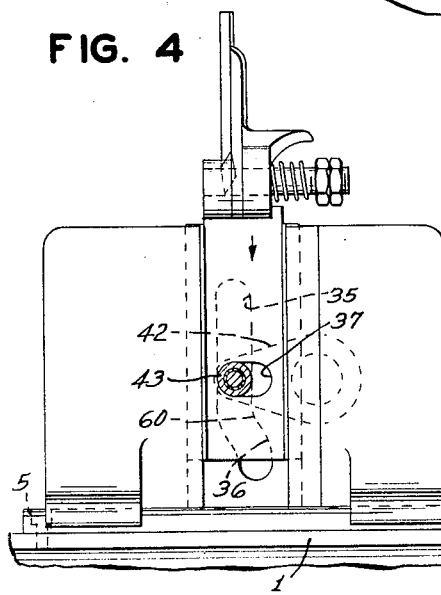
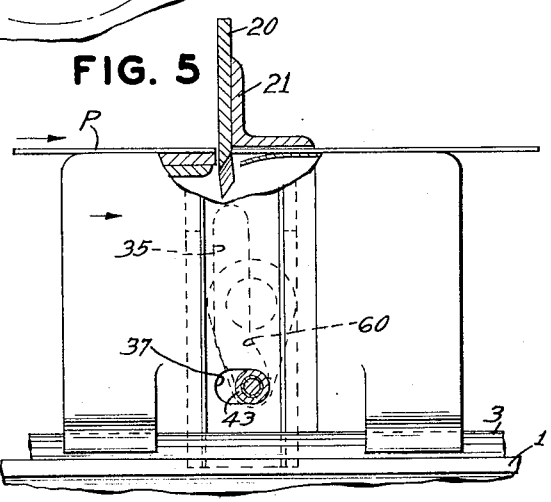

Patented July 18, 1950

2,515,296

UNITED STATES PATENT OFFICE 2,515,296

CUTTING APPARATUS

Edward F. Egan, Bridgewater Township, Somerset County, N. J., assignor to Frank W. Egan & Company, a partnership Application August 23, 1949, Serial No. 111,850

7 Claims. (Cl. 164—47)

This invention relates to apparatus for cutting continuously moving material. More particularly the invention relates to an apparatus of the traveling shear type for cutting relatively short lengths of material from a longer, continuously moving length of material passing through the apparatus. While the apparatus may be advantageously used for cutting materials of various types such as paper, textile fabrics, sheet metal and the like, it is particularly adapted to use in cutting a continuously moving sheet of paper.

In cutting short lengths of material from a longer continuously moving length of material, particularly when the material is paper, it is essential that the means for cutting the material be moving at precisely the same speed as the material during the cutting operation. Were the cutting means moving at a speed slower than that of the material during the cutting operation, the continuously moving material would pile or bunch up behind the cutter. If, on the other hand, the cutting means were moving at a greater speed than the material during the cutting operation, it would tend to tear or rip the material. In addition to having the cutting means moving at the same rate of speed as the continuously moving material during the cutting operation, it is desirable also to have the cutting means move at a speed slightly in excess of that of the continuously moving material for a short period subsequent to the actual cutting operation, that is, during the period of withdrawal of the cutting means from the plane in which the material is continuously moving.

Devices which will cut short lengths of material from a longer, continuously moving length of material are old and are frequently referred to as flying saws or shears. These devices have met with varying degrees of success but many have been extremely complicated and costly to build and have not been entirely successful for a variety of reasons; primarily, because the motion of their cutting means, with respect to the rate of motion of the continuously moving material, has not been satisfactorily controlled during the cutting operation.

My improved apparatus for cutting short lengths of material from a longer, continuously moving length of material comprises a carriage mounted for reciprocation in a direction parallel to the direction of movement of the continuously moving length of material, a cutting means mounted on the carriage for reciprocation in a direction perpendicular thereto, and a driving mechanism operatively connected to the carriage and to the cutting means in such a way that the speed of the carriage when moving in the same direction as the continuously moving material is caused to be the same as that of the moving material at least while the cutting means is making its cut, and is caused to speed up as soon as the cutting means completes its cut, the cutting means being withdrawn from the plane of the moving material during this period when the carriage with the cutter is moving faster than the moving material.

I propose to drive my apparatus from the source of power which drives the apparatus for feeding the material, to be cut, to my cutting apparatus. To this end the drive shaft of my apparatus is so connected to the single source of power that the speed of the carriage during the cutting operation is always the same as that of the material being fed to it. This condition obtains as long as the connection is not altered and thus the material feeding apparatus and my cutting apparatus are always in step, and varying the speed of the driving source results in equal variations in the speeds of the material and of the carriage during the cutting operation. The driving power is transmitted from the drive shaft to a rotary crank, which has a driving pin fixed in its distal end, through a one-revolution clutch, the latter being engaged periodically as a result of the operation of a variable speed mechanism attached to the drive shaft. In order to transform the rotary motion of the crank and pin to the required linear motions for the carriage and the cutting means, specially arranged slots are provided in the carriage and the cutting means respectively. Both of these engage the pin but, being of different configuration, drive the carriage and cutting means differently. These slots will be separately described.

The slot in the carriage is elongated in a direction at right angles to the direction of the desired linear movement of the carriage and is made at least as long as the diameter of the circle described by the driving pin and just wide enough to receive the pin. The pin extends into this elongated slot of the carriage and, upon rotation of the crank, rides back and forth in the slot transmitting to the carriage a linear motion in a direction at right angles to that in which the slot is elongated. The type of cutting action that it is preferable to employ for cutting most materials is a scissor-like shearing one and thus the cutting edge of the cutter blade is inclined with respect to the plane of the moving material. The actual cutting period with such a cutter blade is somewhat longer than it would be with one not having an inclined cutting edge and therefore, the elongated slot, which would normally provide only an instantaneous equalization of the speeds of the carriage and of the moving material, is provided with a portion offset in the direction of movement of the continuously moving material so that the speed of the carriage is the same as that of the moving material throughout the somewhat longer period during which the cutting means is making its cut. The offset portion also provides a period of excess speed of the carriage and the cutting means mounted thereon as soon as the cut is completed so that the cutting means is withdrawn from the plane of the moving material without likelihood of contact with the paper.

The cutting means which, being mounted on the carriage, is simultaneously reciprocated in the direction in which the carriage moves, must additionally be reciprocated in a direction perpendicular to the direction of movement of the carriage in order that it may cut through the paper. A slot to achieve this latter reciprocation of the cutting means is provided, as aforesaid, on the cutting means. Because the cutting means itself reciprocates in the direction of movement of the carriage, the slot in it for reception of the driving pin will not be elongated similarly to the slot in the carriage, the rotary motion of the pin being transformed to a linear motion for the cutting means without such elongation of the slot. It will, however, be elongated in the direction of motion of the carriage in order to permit the pin to follow the offset portion of the slot in the carriage.

The following detailed description of one embodiment of my invention, set forth in conjunction with the accompanying drawings, is directed to apparatus for cutting paper in which, for convenience, the paper moves horizontally and the cutter vertically.

Figure 2:
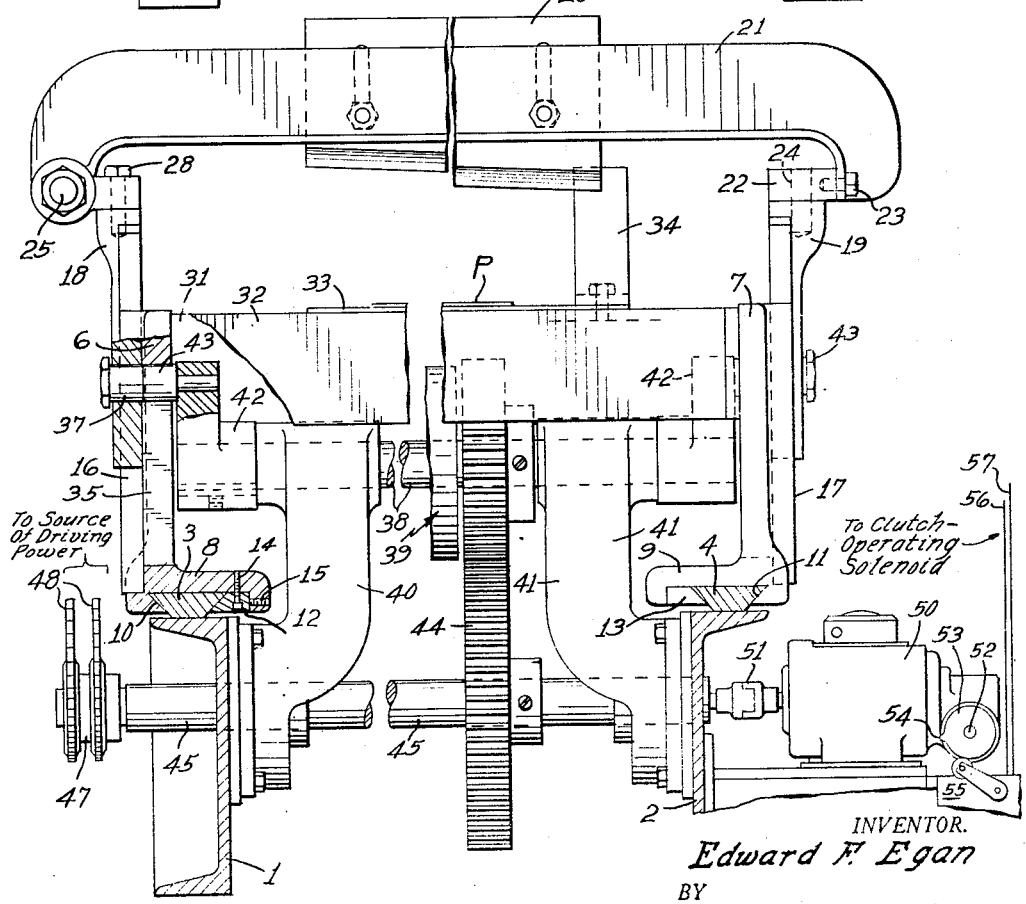

In the drawings:

Fig. 1 is a plan view of the carriage and the cutter mounted thereon, showing their relation to a continuously moving sheet of paper, part of the view being cut away to show the one-revolution clutch and its controlling solenoid mechanism, Fig. 2 is an end elevation of the carriage and cutter, partly in section for the purpose of showing the supporting means for the carriage and the power driven crank and pin by which it and the cutter are reciprocated, Fig. 3 is a partially diagrammatic, side elevation of the carriage and cutter with the carriage in its dwell position and ready to move in a direction opposite to that of the moving paper, Fig. 4 is a view similar to that of Fig. 3, but shows the carriage at the end of its stroke in the direction opposite to the movement of the paper, with the cutter moving downwardly in its cutting stroke, and Fig. 5 is also a similar view and shows the carriage moving in the direction in which the paper moves, with the cutter at the terminal point of its cutting stroke.

Referring to the drawings and particularly to Figs. 1 and 2, the framework by which the carriage and the paper-cutting means are supported comprises, essentially, a pair of channel irons 1 and 2 oppositely disposed in a direction parallel to the direction of movement of a continuously moving sheet of paper P. Dovetail guide rails 3 and 4 are secured, as shown in Fig. 3, by countersunk bolts 5 to the uppersides of the channel irons and extend in the direction of the longitudinal extent of the channel irons.

A carriage for supporting a cutting means is mounted for longitudinal reciprocation in a horizontal plane on guide rails 3 and 4 and is made up essentially of side members 6 and 7, which are provided in their broad base portions 8 and 9 with partial dovetail guideways 10 and 11. Auxiliary members 12 and 13, which are adjustably mounted within the guideways 10 and 11 by means of bolts 14 and adjustment screws 15, transform the partial dovetail guideways into true dovetail guideways by which the carriage may be reciprocably mounted on the guide rails 3 and 4 of the framework.

Vertically disposed dovetail guideways 16 and 17 are formed centrally in the outer faces of side members 6 and 7 of the carriage. Supporting members 18 and 19, for a vertically reciprocable cutting blade 20, ride within the vertically disposed guideways 16 and 17. The cutting blade 20 has an inclined cutting edge and is adjustably mounted on a cross head 21, one end of which is secured to member 22 by bolts 23, member 22 being pivotally mounted on the upper end of supporting member 19 by pin 24 so that the cross head may be pivoted in a horizontal plane. The other end of the cross head 21 is slidably mounted on a stud 25 held in collar member 26 by a pin 27. Member 26 is secured to the upper end of supporting member 18 by bolts 28. A compression spring 29 is also mounted on stud 25 between its head 30 and the end of the cross head and resiliently resists movement of the end of the cross head towards the stud head 30. The purpose of so mounting the cross head will be explained below.

A paper-supporting surface is provided between the side members 6 and 7 of the carriage by members 31 and 32 secured thereto and disposed therebetween. A cutting or bed plate 33, the forward edge of which is so positioned that the cutter blade 20 acts with it, upon reciprocation, as a scissor-like shear, is secured on the upper face of member 31, which is at the feed-in side of the cutting apparatus. The sheet of paper P is adapted to ride on the upper surface of the cutting plate as it is fed past the cutter. A vertically upstanding guide member 34, along one edge of which the cutter blade 20 rides is also mounted on transversely disposed member 31 and, in fact as shown, upon the cutting plate 33, its face being flush with the cutting edge of plate 33. When in the dwell position, that is, when the cross head is at its maximum elevation as shown in Figs. 2 and 3, the right hand end of the cutter blade 20 (Fig. 2), which is its lower end, is engaged by guide member 34 and is thus directly above the cutting edge of plate 33. The left end of the blade however, because of the positioning of collar member 26 and the action of spring 29 on the left end of the cross head, lies slightly behind the vertical plane of the cutting edge of plate 33. Thus, when the cutter blade is moved downwardly, its lower right end first cooperates with the cutting plate 33 and as it descends further the knife edge of the blade progressively cooperates with plate 33 to achieve a true scissor-like shearing action, the pivot mounting of the cross head permitting the left end of the cross head to move on stud 25, against the action of spring 29, the distance necessary to retract the blade by the amount of its overhang of plate 33.

A vertically elongated slot 35, the shape of which is best shown in Figs. 3–5, is provided in each of the side members 6 and 7 of the carriage. These vertically elongated slots 35 lie at the bottom of the dovetail guideways in the side members, and the lower portion of each is offset as indicated at 36 substantially in the direction in which the paper is moving. Considerably shorter, horizontally elongated slots 37 are formed in each of supporting members 18 and 19 toward the lower ends thereof and are partially coincident with the vertically elongated slots 35 in the side members of the carriage. A drive shaft 38, including a one-revolution clutch 39 (Fig. 2), is disposed transversely between the side members of the carriage and supported by upstanding brackets 40 and 41, the bottoms of which are secured to the inner faces of channel members 1 and 2 of the supporting framework. A crank 42 in the distal end of which is secured a pin member 43 (as best seen in Fig. 2) is fixedly secured on each end of the drive shaft 38. Pins 43 extend through the vertically elongated slots 35 of carriage side members 6 and 7 and through slots 37 of the vertically reciprocable members 18 and 19. Because of the shape of slots 37, the pins 43 provide support for the reciprocable members 18 and 19, cross head 21, and cutter blade 20, as well as means for reciprocating horizontally both the carriage and the cutting means, and vertically the cutting means itself. Drive shaft 38 is driven through the one-revolution clutch 39 by means of a driving gear 44 which meshes with a driving gear of the one-revolution clutch. Driving gear 44 is itself supported and driven by a drive shaft 45 mounted in bearings secured to the inner faces of the channel members 1 and 2 of the framework, the drive shaft extending through the channel members. A sprocket 47, driven by driving chains 48, is mounted on one end of drive shaft 45. Chains 48 are also connected to the source of driving power for the paper processing apparatus (not shown) or to its line shaft. The paper processing apparatus includes feed rolls (also not shown) by which the paper is fed to the cutting apparatus at a predetermined speed. Thus, by selecting the proper gear ratio for permanently connecting the sprocket 47 to the source of power, the speed of the carriage of the cutting apparatus during the cutting period may be made the same as that of the paper being fed to the apparatus. Providing the connection is not altered, varying the speed of the driving source will merely vary the speed with which the paper is fed to the cutting apparatus, and the speed of the carriage during the cutting period will be varied accordingly. Thus the carriage and the paper feeding mechanism will always be in step.

A variable speed mechanism 50 (Fig. 2) is connected by a jaw coupling 51 to the other end of drive shaft 45. This mechanism is provided with an output shaft 52 on which is mounted a cam 53 having a single lobe 54 which actuates a microswitch 55 once every revolution of the output shaft. The microswitch 55 is connected by conductors 56 and 57 to a solenoid 58 (Fig. 1) which controls the operation of the one-revolution clutch 39. When the microswitch is actuated it causes the solenoid to be energized and to withdraw a latch 59 engaging a trip mechanism on the one-revolution clutch thereby permitting the clutch to be engaged and operate the cutting apparatus to make one cut. By the time the cutting apparatus has completed its cycle, to be described in more detail subsequently, the microswitch is again open and the solenoid is de-energized, thereby releasing the latch and disengaging the clutch.

The operation of the cutting apparatus will now be explained by reference to Figs. 3–5. Fig. 3 shows the carriage and cutting means at the dwell position or at mid-position in their strokes in the direction opposite to that in which the paper P is moving, the cutting means at this point being at the terminal position of its upward or withdrawal stroke. As the cranks 42 are rotated to the position shown in Fig. 4, the reciprocating cutting means begins to descend through its cutting stroke and both it and the carriage are moved to the end of the non-working stroke of the carriage. Thus, the representation, as shown in Fig. 4, shows the carriage at the end of its non-working stroke and the cutting means at the midpoint of its cutting stroke. Moving from the position shown in Fig. 4 to that shown in Fig. 5, the cranks 42 through pins 43, move the carriage through one-half of its cutting stroke and the cutting means through the second half of its cutting stroke. During this portion of the operation of the apparatus, the carriage attains a speed equal to that of the moving paper and maintains such a speed until the cutting stroke of the cutting means is completed. The cutter blade 20, during the cutting operation, cooperates with the leading edge of the cutting or bed plate 27 to cut the sheet of paper P by a scissor-like shearing action as previously described.

The relatively prolonged period of constant speed, that is, when the speed of the carriage is equal to the speed of the moving paper, is achieved by reason of the offset portions of the elongated slots 35 in the carriage, and exists from the time pins 43 reach shoulders 60 of the elongated slots until the pins reach a position very slightly subsequent to the position as shown in Fig. 5. It will, of course be apparent that the speed of rotation of the cranks is primarily responsible for the speed of reciprocation of both the carriage and the cutting means and that the offset portions 36 of the elongated slots merely make possible a transformation of the constant speed of rotation of the crank into a constant linear speed for the carriage during a portion of the working stroke of the carriage.

For a short period of time during the rotation of the cranks beyond their positions as shown in Fig. 5, the offset portions of the elongated slots cause the linear speed of the carriage to exceed that of the moving paper. This short period of time is that during which pins 43 move from their position as shown in Fig. 5 to a position above the shoulders 60 in the slots. This period of excess speed is desirable to permit the cutter blade to be retracted from the plane of movement of the paper without adversely affecting the continuous motion of the paper through the apparatus.

The reason for the elongation of slots 37 will be apparent from the operation of the apparatus. Because pins 43 are always constrained to move within elongated slots 35 in the carriage, and the cutting means is likewise always constrained to move within the dovetail guideways 16 and 17 of the carriage, pins 43, extending through both the slots 35 and the slots 37 will necessarily have to have a certain latitude of movement within slots 37 or otherwise it would not be possible for them to follow their intended paths in slots 35. This latitude of movement is accomplished by making slots 37 of such dimensions that portions of them suitable for receiving the driving pins may always coincide with a portion of the elongated slots 35 of the carriage.

The length of the pieces of paper cut from the continuously moving sheet P depends entirely upon the frequency with which the driving cranks 42 are rotated, providing of course that the speed of the moving sheet is constant. The frequency of rotation of the driving cranks 42 is, in turn, dependent upon the frequency with which the one-revolution clutch is engaged. The variable speed mechanism 50 controls the frequency of the actuations of the micro-switch and thus the frequency of the operation of the clutch. By properly varying the setting of the variable speed mechanism, the length of time required for its output shaft 52 to make one revolution may be lengthened or shortened, thereby respectively increasing or decreasing the lengths of the pieces of paper cut from the sheet of paper P.

It is to be understood that various changes and modifications may be made in the above-described apparatus without departing from my invention.

I claim:

1. Apparatus for cutting short lengths of material from a longer, continuously moving length of material fed through said apparatus, which comprises a carriage mounted for reciprocation in a direction parallel to the direction of movement of said longer length of material, said carriage having a slot in one of its side members elongated in a direction substantially perpendicular to the direction of reciprocation of the carriage, cutting means mounted on said carriage for reciprocation in a direction substantially perpendicular to the direction of movement of the carriage and of the moving material and having a slot therein partially coinciding with a portion of said elongated slot, and rotary means for reciprocating said carriage and said cutting means, said rotary means comprising a power driven crank and a pin secured in the distal end of said crank and extending through the elongated slot in the member of said carriage and through a slot in said cutting means, whereby rotation of the crank effects reciprocation of the carriage and the cutting means in a direction parallel to the direction of movement of the material and also reciprocation of said cutting means in a direction substantially perpendicular thereto.

2. Apparatus as set forth in claim 1 which includes means, including a one-revolution clutch, for periodically driving said rotary means at a fixed speed with respect to the speed at which the continuously moving material is fed through the apparatus, and which includes a variable speed mechanism for periodically engaging and disengaging the one-revolution clutch.

3. Apparatus as set forth in claim 1 in which the cutting means includes a cutting blade having its cutting edge inclined with respect to the plane of the moving material and in which that part of the elongated slot in the carriage in which the driving pin slides, to move the carriage in the same direction as the moving material, has a portion offset in the direction of movement of the moving material which causes the speed of the carriage to be constant during that portion of its stroke in said direction when the cutting means is cutting the material and which causes the carriage and the cutting means to move at a speed greater than said constant speed after the cutting means has completed its cutting operation, the apparatus also including a means for driving the power driven crank at a speed which causes the constant speed to be equal to the speed of the moving material.

4. Apparatus as set forth in claim 3 in which the lower end of the elongated slot is offset in the direction of movement of the moving material.

5. Apparatus for cutting short lengths of material from a longer, continuously moving length of material fed through said apparatus, which comprises a supporting framework including guide rails, a carriage mounted on said guide rails for reciprocation thereon in a direction parallel to the direction of movement of said longer length of material, said carriage having slots in its side members elongated in a direction substantially perpendicular to the direction of reciprocation of the carriage, cutting means, including a cutting blade disposed transversely of and above said carriage, mounted on said carriage for reciprocation in a direction substantially perpendicular to the direction of movement of the carriage and having slots therein partially coinciding with said elongated slots, and rotary means for reciprocating said carriage and said cutting means, said rotary means comprising a drive shaft supported by said framework, a crank secured to said shaft at each end thereof, a pin secured to each crank at the distal end thereof and extending through the elongated slot in the adjacent side member of said carriage and through the slot in the adjacent portion of said cutting means, whereby rotation of the cranks effects reciprocation of the carriage and the cutting means in a direction parallel to the direction of movement of the moving material and also reciprocation of said cutting means in a direction substantially perpendicular thereto.

6. Apparatus as set forth in claim 5 which includes a bed plate mounted upon the carriage and adapted to support the material as it passes through the apparatus, said bed plate cooperating with said cutting blade, upon reciprocation of the cutting blade, to cut said material by a shearing action.

7. Apparatus as set forth in claim 5 which includes means for driving the power driven cranks at a fixed speed with respect to the speed at which the continuously moving material is fed through the apparatus and in which the lower ends of the elongated slots are offset in the direction of movement of the material, whereby the power driven cranks may be driven at such a speed that the speed of the carriage and of the cutting means is equal to the speed of the moving material during that portion of its stroke in the direction of movement of the material when the cutting means is cutting the material and exceeds the speed of the moving material subsequent to the completion of the cut.

EDWARD F. EGAN.

No references cited.